United States Patent
Lin (10) Patent No.: US 9,638,985 B1
(45) Date of Patent: May 2, 2017

(54) ADJUSTING DEVICE OF FOCUSING CURVE OF CAMERA LENS MOTOR AND METHOD

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Cheng-Long Lin, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/984,309

(22) Filed: Dec. 30, 2015

(30) Foreign Application Priority Data

Dec. 2, 2015 (TW) .............................. 104140418 A (51) Int. Cl.
G03B 13/36 (2006.01)
G03B 3/10 (2006.01)
G02B 7/04 (2006.01)

(52) U.S. Cl.
CPC ......... *G03B 3/10* (2013.01); *G02B 7/04* (2013.01)

(58) Field of Classification Search
None
See application file for complete search history.

(56) References Cited

U.S. PATENT DOCUMENTS

| 6,624,851 | B1* | 9/2003 | Okajima | G02B 7/102 348/347 |
| 2006/0198621 | A1* | 9/2006 | Triteyaprasert | G03B 3/02 396/79 |
| 2007/0206936 | A1* | 9/2007 | Lin | H04N 5/23296 396/81 |
| 2010/0178045 | A1* | 7/2010 | Hongu | G02B 7/102 396/80 |
| 2012/0008037 | A1* | 1/2012 | Yamanaka | H04N 5/23296 348/345 |
| 2012/0120303 | A1* | 5/2012 | Yamanaka | G02B 7/102 348/347 |
| 2012/0170921 | A1* | 7/2012 | Okazaki | G03B 3/10 396/77 |
| 2013/0321693 | A1 | 12/2013 | Lin | |
| 2014/0002606 | A1 | 1/2014 | Blayvas et al. | |

FOREIGN PATENT DOCUMENTS

JP 2009-58834 A 3/2009
TW 201350955 A 12/2013

* cited by examiner

*Primary Examiner* — W B Perkey
(74) *Attorney, Agent, or Firm* — Steven Reiss (57) ABSTRACT

An adjusting method and device of focusing curve of camera lens is disclosed. Steps of the adjusting method of focusing curve of camera lens includes: determining an adjustable moving range; moving the camera lens in the area of adjustable moving range, and recording a high definition of the camera lens; computing a difference value of a initial position of the camera lens and the high definition of the camera lens, and computing a focus offset; adjusting the focusing curve according to the focusing curve. Therefore, the angle of the camera lens motor can be adjusted accurately.

10 Claims, 7 Drawing Sheets

ADJUSTING DEVICE OF FOCUSING CURVE OF CAMERA LENS MOTOR AND METHOD

FIELD

The subject matter herein generally relates to an adjusting device of focusing curve of camera lens motor and method.

BACKGROUND

Camera lens usually cannot be adjusted accurately through general manner, which will reduce sharpness of pictures in focusing.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The disclosure will now be described in relation to an adjusting device of focusing curve of camera lens motor and method.

Figure 1:
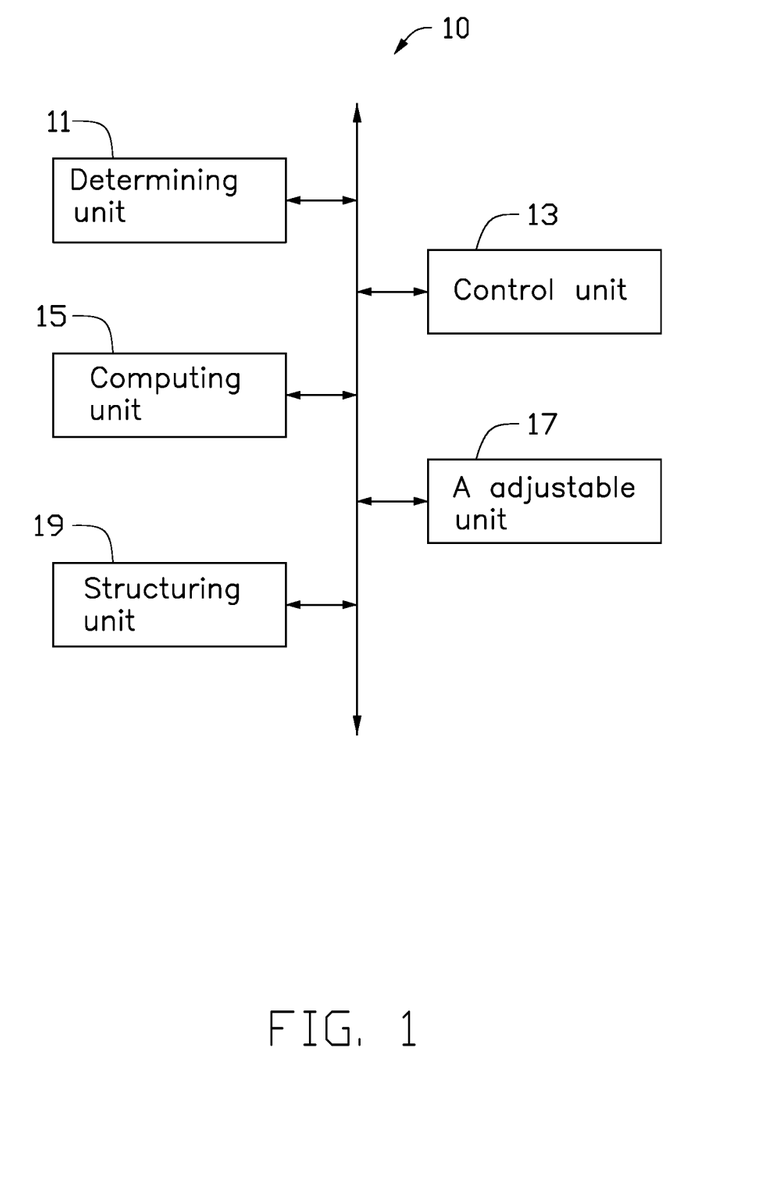
FIG. 1 is a block diagram of one embodiment of an adjusting device of focusing curve of camera lens motor, wherein the camera lens motor can include different focus segments.

FIG. 1 illustrates one embodiment of a block diagram of one embodiment of an adjusting device 10 of focusing curve of camera lens motor. The adjusting device 10 can include, but not limited to, an adjustable range determining unit 11, a control unit 13, a computing unit 15, an adjustable unit 17, and a structuring unit 19. The adjustable range determining unit 11 is used to determine an adjustable range R in focusing curves of the camera lens motor. The control unit 13 is used to control the camera lens motor to move in the adjustable range R according to an initial position "fs" of the camera lens motor, and record a present position "fsharp" of the camera lens motor with a highest sharpness. The computing unit 15 is used to computing a difference value of the initial position "fs" and the present position "fsharp", to determine a offset value "focusoffset" by a formula as follow: focusoffset=fs−fsharp. The adjustable unit 17 is used to adjust a proper focusing curve according to the offset value "focusoffset". The structuring unit 19 is used to structure a numerical table $R_{i,j}$ with an array of I*J.

Figure 2:
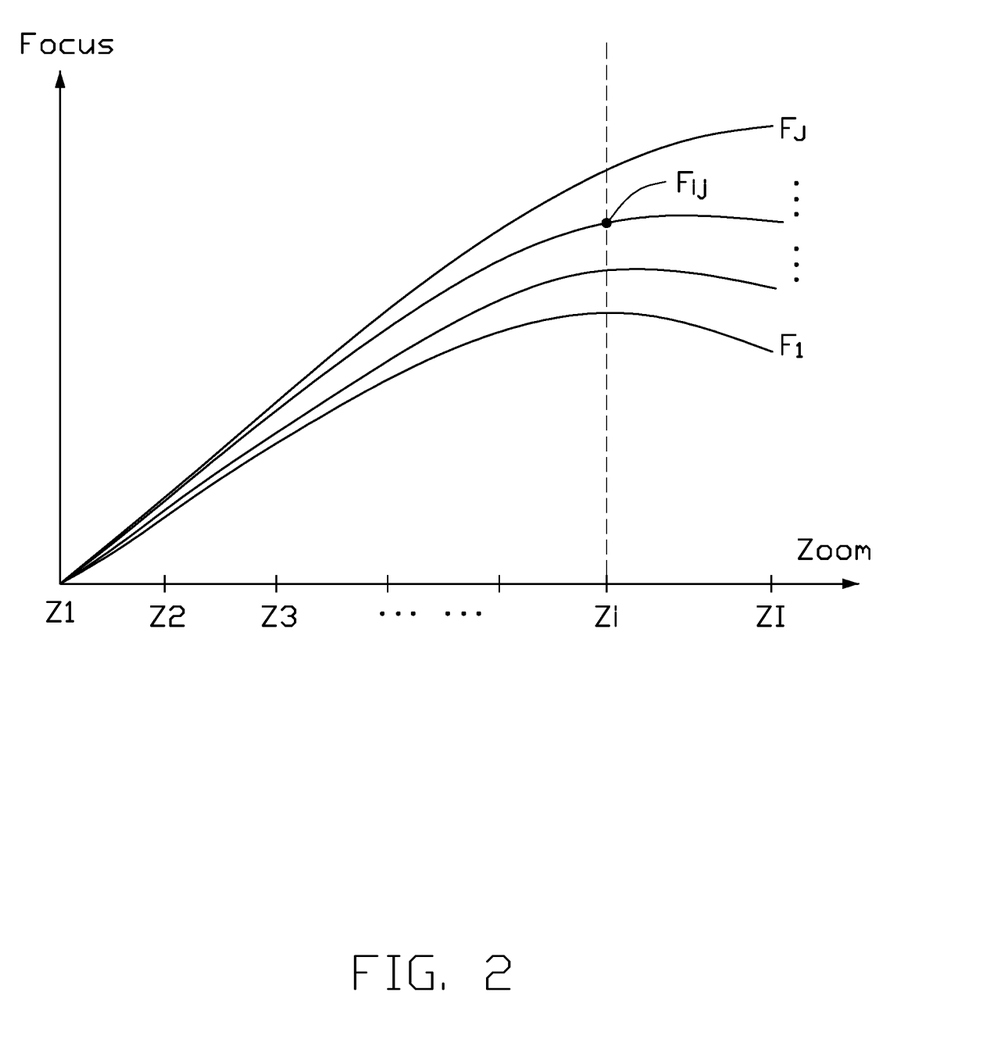
FIG. 2 is a diagrammatic illustration of focusing curves in different focus segments of the camera lens motor of FIG. 1, wherein the different focus segments includes an adjustable range for focusing curves.
Figure 3:
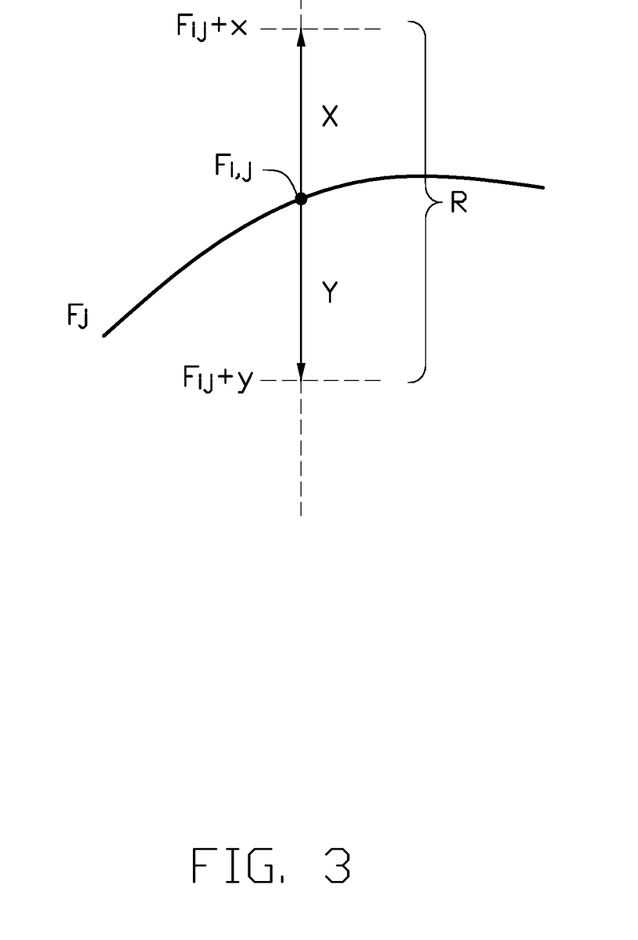
FIG. 3 is a diagrammatic illustration of the adjustable range in the focusing curves of the camera lens motor of FIG. 1.

In at least one embodiment, the camera lens can include a plurality of focus sections $Z_i$ (1≤i≤I, "I" is the number of the focus sections), and a plurality of focusing curves $F_j$ (1≤j≤J, "J" is the number of the focusing curves) as illustrated in FIG. 2. The focus section $Z_1$ is a most wide. The focus section $Z_I$ is a telescopic end. The focusing curve $F_1$ is a focusing curve of the nearest object. The $F_J$ is a focusing curve of the farthest object. $F_{i,j}$ is a position of the camera lens motor on the focus section $Z_i$ and focusing curves $F_j$. The structuring unit 19 is used to adjust slightly the angle of the camera lens motor, to determine the adjustable range $R_{i,j}$ of the of the camera lens motor on the focus section $Z_i$ and focusing curves $F_j$. The adjustable range $R_{i,j}$ is less than a preset value. Referring to FIG. 3, the camera lens motor can be moved a first distance X to far direction and then moved a second distance Y to near direction, so that the adjustable range $R_{i,j}$ is equal to a summation of the first distance X and the second distance Y.

Figure 4:
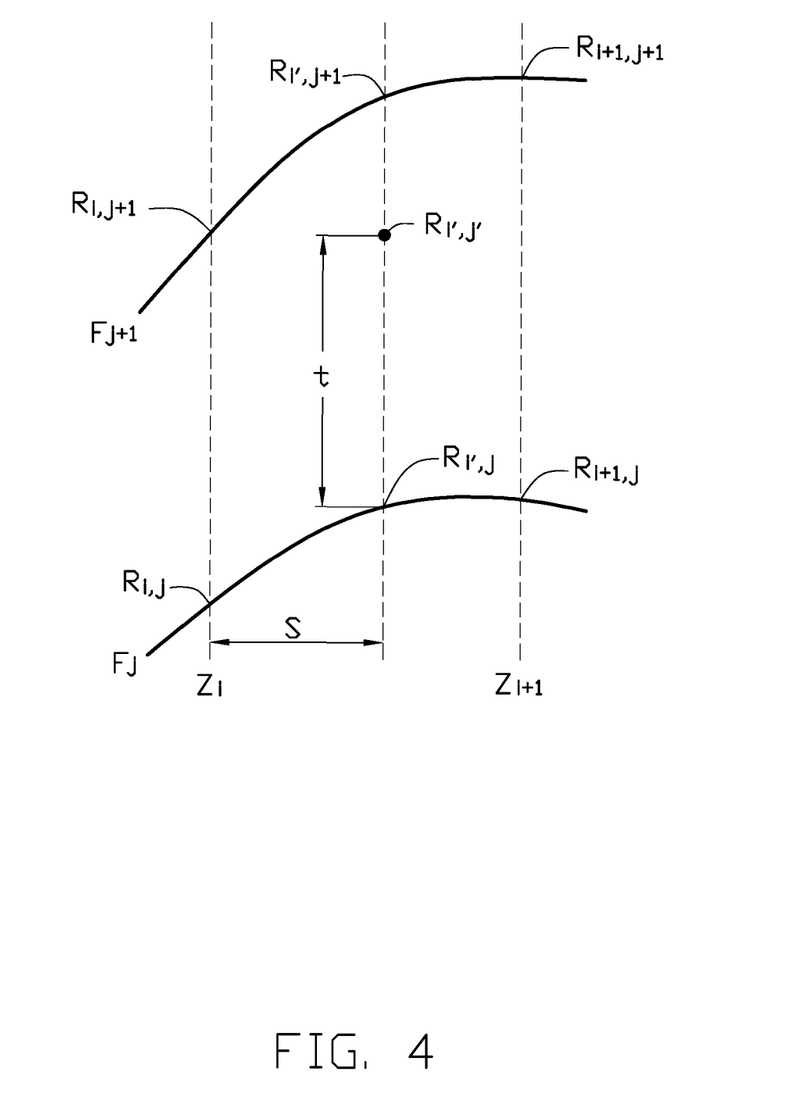
FIG. 4 is a diagrammatic illustration of an adjustable range $R_{i',j'}$ of any one focus point in an area between the different focusing curves of the camera lens motor of FIG. 1.

FIG. 4 illustrates a diagrammatic diagram of an adjustable range $R_{i',j'}$ of any one focus point in an area between the different focusing curves of the camera lens motor. For example, if two focusing curves adjacent have four adjustable ranges $R_{i,j}$; $R_{i+1,j}$; $R_{i,j+1}$; $R_{i+j+1}$ the adjustable range $R_{i,j}$ moves a distance S in one unit of the magnification times and moves a distance t in one unit of the force sections. The computing unit 15 can be also used to compute an adjustable range $R_{i',j'}$ of any one focus point in an area between the different focusing curves of the camera lens motor by a formula as follow:

$$Ri',j+1=((Ri+1,j+1-Ri,j+1)*s/(Zi+1-Zi))+Ri,j+1; \quad (i)$$

$$Ri',j=((Ri+1,j-Ri,j)*s/(Zi+1-Zi))+Ri,j; \quad (ii)$$

$$Ri',j'=((Ri',j+1-Ri',j)*t/(Fi',j+1-Fi',j))+Ri',j. \quad (iii)$$

Figure 5:
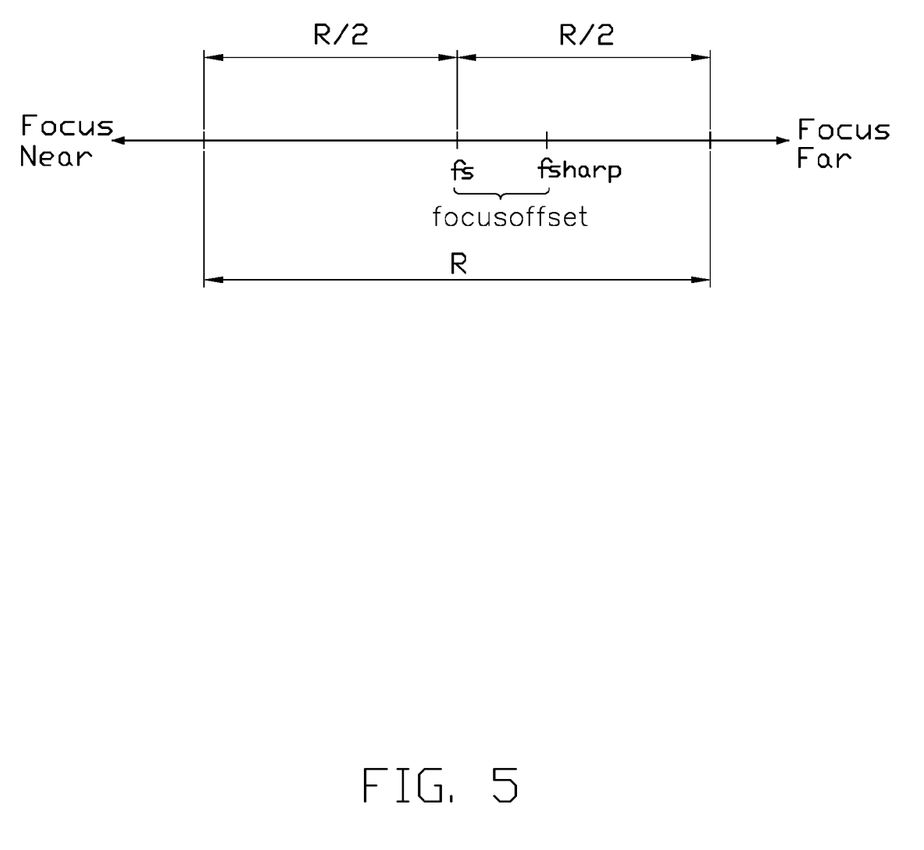
FIG. 5 is a diagrammatic illustration of offset of focusing curves of FIG. 1

Therefore, the adjustable range R can be computed by the formulas (i), (ii), and (iii). Then, the control unit 13 controls the camera lens motor to move in the adjustable range R to record a present position "fsharp" of the camera lens motor. Referring to FIG. 5, the camera lens motor can be adjusted to move for a distance of R/2 towarding far direction, and then be moved for a distance of R towarding near direction in the adjustable range R, according to the initial position "fs", to record the present position "fsharp" of the camera lens motor with a highest sharpness. Thus, the offset value "focusoffset" can be determined by a formula, focusoffset=fs-fsharp, to make the adjustable unit 17 adjust a proper focusing curve according to the offset value "focusoffset".

Figure 6:
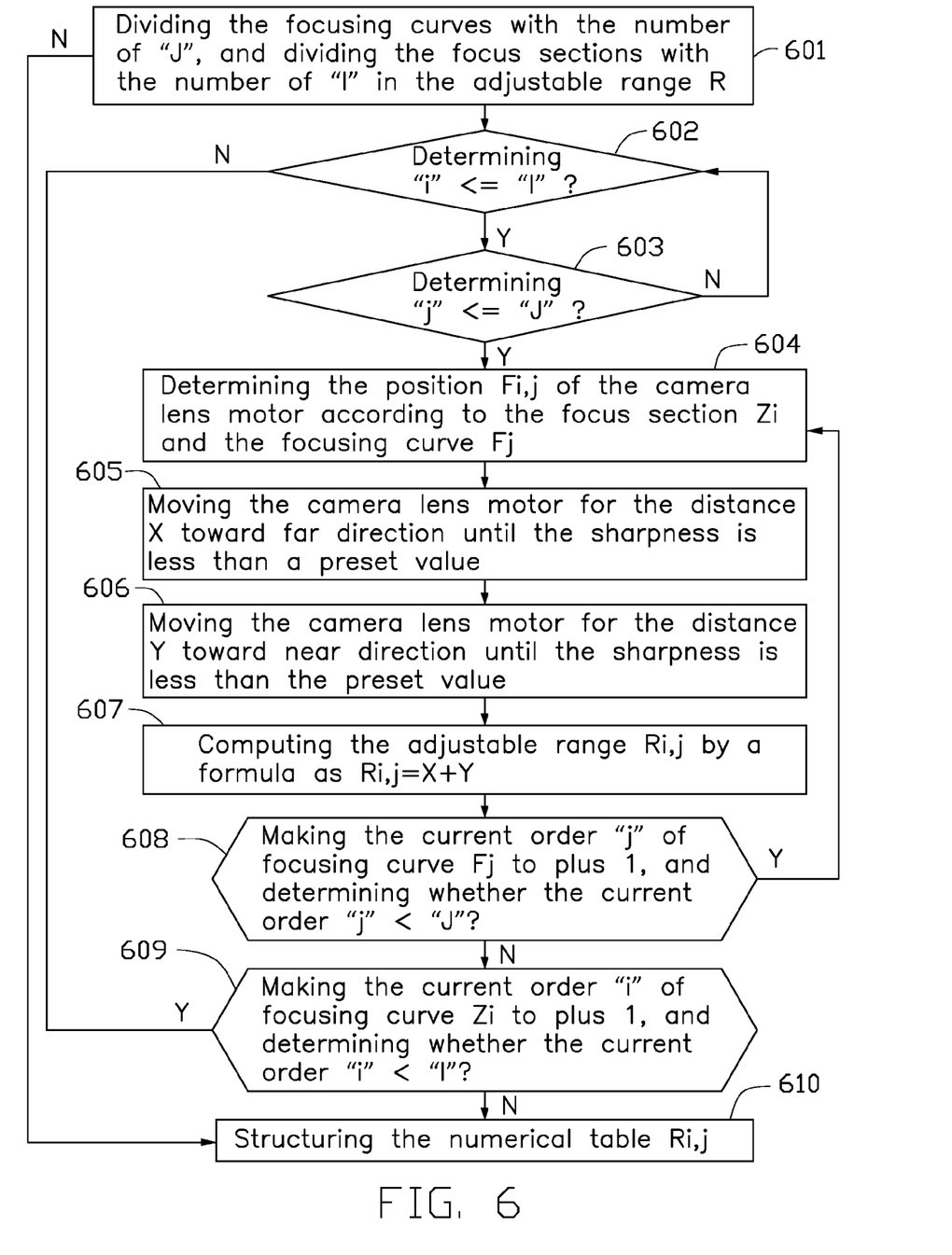
FIG. 6 is a flow chart of adjusting method of focusing curve of the camera lens motor.
Figure 7:
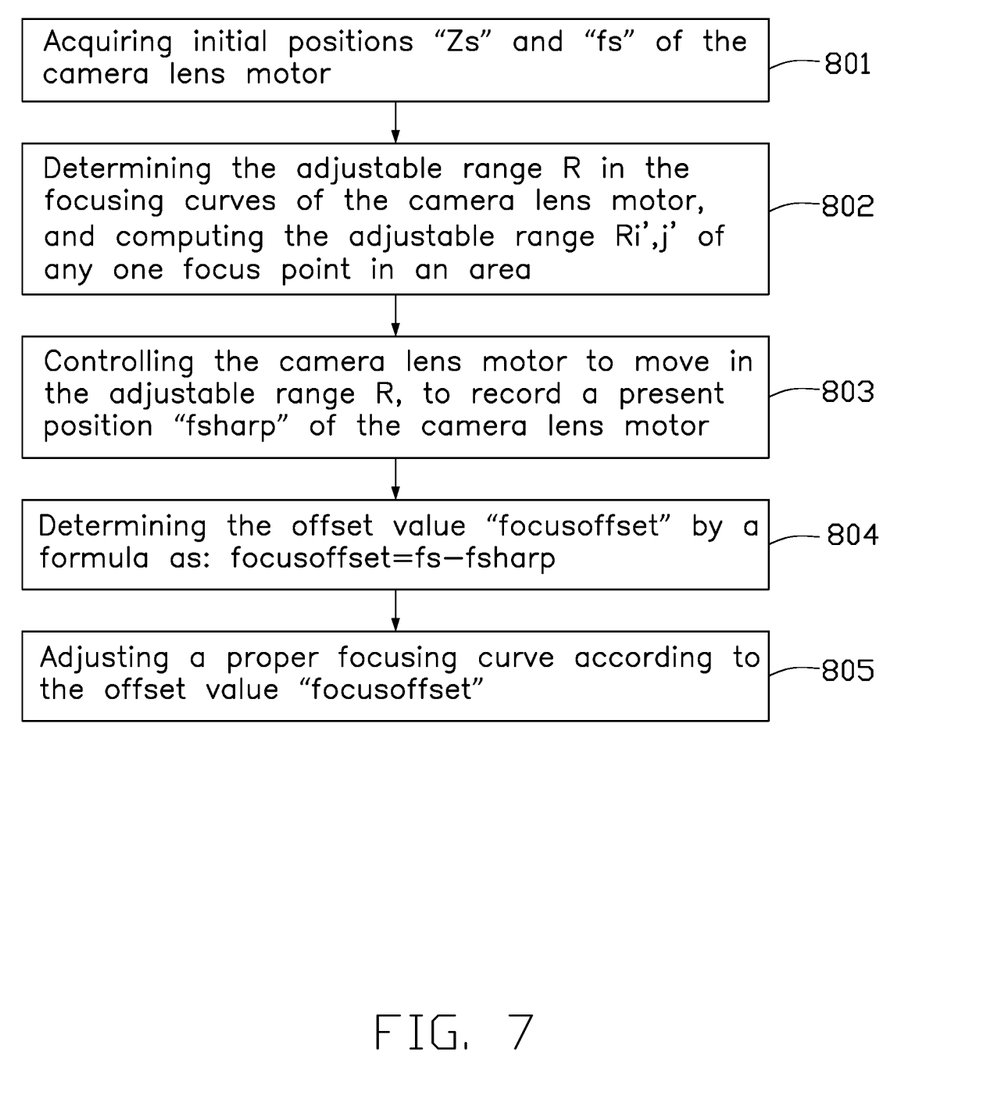
FIG. 7 is a flow chart of structuring a numerical table of the camera lens motor.

Referring to FIGS. 6 and 7, flowcharts are presented in accordance with an example embodiment of an adjusting method of focusing curve of camera lens motor which are being thus illustrated. The example method is provided by way of example, as there are a variety of ways to carry out the method. The method described below can be carried out using the configurations illustrated in FIG. 1, for example, and various elements of the figure is referenced in explaining example method.

The exemplary method can be executed by pedestrian adjusting device 10. In at least one embodiment, a numerical table $R_{i,j}$ can be structured as program in a processor of a product using the camera lens motor. The process can begin at block 601.

Regarding to FIG. 6, at block 601, the control unit 13 divides the focusing curves with the number of "J" and divides the focus sections with the number of "I" in the adjustable range R.

At block 602, the computing unit 15 determines whether the order "i" of focus section $Z_i$ is less or equal to "I". If the order "i" of focus section $Z_i$ is less or equal to "I", the process goes to S603; otherwise, the process goes to S610.

At block 603, the computing unit 15 determines whether the order "j" of focusing curve $F_j$ is less or equal to "J". If the order "j" of focus section $F_j$ is less or equal to "J", the process goes to S604; otherwise, the process goes to S602.

At block 604, the adjustable range determining unit 11 determines the position $F_{i,j}$ of the camera lens motor, according to the focus section $Z_i$ and the focusing curve $F_j$.

At block 605, the adjustable unit 17 can move the camera lens motor for the distance X toward far direction, until the sharpness is less than a preset value.

At block 606, the adjustable unit 17 can move the camera lens motor for the distance Y toward near direction, until the sharpness is less than the preset value.

At block 607, the computing unit 15 can compute the adjustable range $R_{i,j}$ by a formula as follow: $R_{i,j}=X+Y$.

At block 608, the computing unit 15 makes the current order "j" of focusing curve $F_j$ to plus 1, and determines whether the current order "j" is less than "J" of the focusing curve $F_J$. If the current order "j" is less than "I" of the focusing curve $F_j$, the process goes to S604; otherwise, the process goes to S609.

At block 609, the computing unit 15 makes the current order "i" of focus section $Z_i$ to plus 1, and determines whether the current order "i" is less than "I" of the focus section $Z_1$. If the current order "i" is less than "I" of the focusing curve $Z_1$, the process goes to S603; otherwise, the process goes to S610.

At block 610, the numerical table $R_{i,j}$ is structured.

When the adjustable unit 17 of the camera lens motor operates, the process of adjusting method of the lens motor operates can begin at block 801.

Regarding to FIG. 7, at block 801, acquiring initial positions "Zs" and "fs" of the camera lens motor, wherein the "Zs" is magnification, and the "fs" is initial focus section.

At block 802, the adjustable range determining unit 11 determines the adjustable range R in the focusing curves of the camera lens motor. If two focusing curves adjacent have four adjustable ranges $R_{i,j}$; $R_{i+1,j}$; $R_{i,j+1}$; $R_{1+1,j+1}$, the adjustable range $R_{i,j}$ moves a distance S in one unit of the magnification times and moves a distance t in one unit of the force sections. The adjustable range $R_{i',j'}$ of any one focus point in an area between the different focusing curves of the camera lens motor can be computed by a formula as follow:

$$R_{i',j+1}=((R_{i+1,j+1}-R_{i,j+1})*s/(Z_{i+1}-Z_i)+R_{i,j+1};$$ (i)

$$R_{i',j}=((R_{i+1,j}-R_{i,j})*s/)(Z_{i+1}-Z_i))+R_{i,j};$$ (ii)

$$R_{i',j'}=((R_{i',j+1}-R_{i',j})*t/F_{i',j+1}-F_{i',j}))+R_{i',j};$$ (iii)

At block 803, the control unit 13 controls the camera lens motor to move in the adjustable range R, to record a present position "fsharp" of the camera lens motor. The camera lens motor can be adjust to move for a distance of R/2 towards far direction, and then be moved for a distance of R towards near direction in the adjustable range R, according to the initial position "fs", to record the present position "fsharp" of the camera lens motor with a highest sharpness.

At block 804, the offset value "focusoffset" can be determined by a formula as follow: focusoffset=fs-fsharp.

At block 805, The adjustable unit 17 adjusting a proper focusing curve according to the offset value "focusoffset".

Therefore, the angle of the camera lens motor can be adjusted accurately.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An adjusting method of focusing curve of camera lens motor comprising:
   determining an adjustable range R in focusing curves of the camera lens motor;
   controlling, according to an initial position "fs" of the camera lens motor, the camera lens motor to move in the adjustable range R;
   recording a present position "fsharp" of the camera lens motor with a highest sharpness;
   computing a difference value of the initial position and the present position, the difference value being used to determine a offset value;
   adjusting, according to the offset value, a proper focusing curve.

2. The adjusting method according to claim 1, further comprising structuring a numerical table $R_{i,j}$ with an array of I*J, wherein the camera lens comprise a plurality of focus sections $Z_i$ (1≤i≤I, "I" is the number of the focus sections), and a plurality of focusing curves $F_j$ (1≤j≤J, "J" is the number of the focusing curves); the focus section $Z_1$ is a most wide; the focus section $Z_I$ is a telescopic end; the focusing curve $F_1$ is a focusing curve of the nearest object; the $F_J$ is a focusing curve of the farthest object; $F_{i,j}$ is a position of the camera lens motor on the focus section $Z_i$ and focusing curves $F_j$.

3. The adjusting method according to claim 2, wherein the process of structuring a numerical table $R_{i,j}$ comprises:
   adjusting slightly the angle of the camera lens motor;
   determining the adjustable range $R_{i,j}$ of the of the camera lens motor on the focus section $Z_i$ and focusing curves $F_j$;
   wherein the adjustable range $R_{i,j}$ is less than a preset value.

4. The adjusting method according to claim 3, wherein the process of adjusting slightly the angle of the camera lens motor comprises:
   controlling the camera lens motor to move a first distance X to far direction;

controlling the camera lens motor to move a second distance Y to near direction;

wherein the adjustable range $R_{i,j}$ is equal to a summation of the first distance X and the second distance Y.

5. The adjusting method according to claim 4, wherein if two focusing curves adjacent have four adjustable ranges $R_{i,j}$; $R_{i+1,j}$; $R_{i,j+1}$; $R_{i+1,j+1}$, the adjustable range $R_{i,j}$ moves a distance S in one unit of the magnification times and moves a distance t in one unit of the force sections; the adjustable range $R_{i',j'}$ of any one focus point in an area between the different focusing curves of the camera lens motor can be computed by a formula as follow:

$$R_{i',j+1} = R_{i+1,j+1} - R_{i,j+1})*s/(Z_{i+1}-Z_i))+R_{i,j+1};$$

$$R_{i',j} = ((R_{i+1,j}-R_{i,j})*s/(Z_{i+1}-Z_i))R_{i,j};$$

$$R_{i',j'} = (R_{i',j+1}-R_{i',j})*t/(F_{i',j+1}-F_{i',j}))+R_{i',j}.$$

6. An adjusting device of focusing curve of camera lens motor comprising:

an adjustable range determining unit used to determine an adjustable range R in focusing curves of the camera lens motor;

a control unit used to control the camera lens motor to move in the adjustable range R according to an initial position "fs" of the camera lens motor, and recording a present position "fsharp" of the camera lens motor with a highest sharpness;

a computing unit used to compute a difference value of the initial position and the present position, to determine a offset value;

an adjustable unit used to adjust a proper focusing curve according to the offset value.

7. The adjusting device according to claim 6, further comprising a structuring unit used to structure a numerical table $R_{i,j}$ with an array of I*J, wherein the camera lens comprise a plurality of focus sections $Z_i$ ($1 \leq i \leq I$, "I" is the number of the focus sections), and a plurality of focusing curves $F_j$($1 \leq j \leq J$, "J" is the number of the focusing curves); the focus section $Z_1$ is a most wide; the focus section $Z_I$ is a telescopic end; the focusing curve $F_1$ is a focusing curve of the nearest object; the $F_J$ is a focusing curve of the farthest object; $F_{i,j}$ is a position of the camera lens motor on the focus section $Z_i$ and focusing curves $F_j$.

8. The adjusting device according to claim 7, wherein the adjustable unit can also used to adjust slightly the angle of the camera lens motor, to determine the adjustable range $R_{i,j}$ of the of the camera lens motor on the focus section $Z_i$ and focusing curves $F_j$; the adjustable range $R_{i,j}$ is less than a preset value.

9. The adjusting device according to claim 8, wherein the adjustable unit can adjust slightly the angle of the camera lens motor by controlling the camera lens motor to move a first distance X to far direction, and a second distance Y to near direction; the adjustable range $R_{i,j}$ is equal to a summation of the first distance X and the second distance Y.

10. The adjusting device according to claim 9, wherein if two focusing curves adjacent have four adjustable ranges $R_{i,j}$; $R_{i+1,j}$; $R_{i,j+1}$; $R_{i+1,j+1}$, the adjustable range $R_{i,j}$ moves a distance S in one unit of the magnification times and moves a distance t in one unit of the force sections; the adjustable range $R_{i',j'}$ of any one focus point in an area between the different focusing curves of the camera lens motor can be computed by a formula as follow:

$$R_{i',j+1} = ((Ri_{+1,j+1}-R_{i,j+1})*s/(Z_{i+1}-Z_i))+R_{i,j+1};$$

$$R_{i',j} = R_{i+1,j}-R_{i,j})*s/(Z_{i+1}-Z_i))+R_{i,j};$$

$$R_{i',j'} = ((R_{i',j+1}-R_{i',j})*t/(F_{i',j+1}-F_{i',j}))+R_{i',j}.$$

* * * * *